United States Patent [19]

Morris

[11] Patent Number: 4,620,360

[45] Date of Patent: Nov. 4, 1986

[54] SHOCK ABSORBER REMOVING TOOL

[75] Inventor: Gary D. Morris, Klamath Falls, Oreg.

[73] Assignee: Lisle Corporation, Clarinda, Iowa

[21] Appl. No.: 685,468

[22] Filed: Dec. 24, 1984

[51] Int. Cl.[4] .......... B23D 29/02

[52] U.S. Cl. .......... 29/566.1; 29/270

[58] Field of Search .......... 29/566.1, 270, 426.4; 81/459, 53.2; 225/93, 102

[56] References Cited

U.S. PATENT DOCUMENTS 3,890,692 6/1975 Jandura, Jr. .......... 29/270

FOREIGN PATENT DOCUMENTS 3110389 11/1982 Fed. Rep. of Germany .......... 81/53.2
346351 1/1905 France .......... 81/53.2
611906 10/1926 France .......... 81/53.2

OTHER PUBLICATIONS

California Tool Co. Catalog p. 509, Items 542 and 2333.

*Primary Examiner*—John McQuade
*Attorney, Agent, or Firm*—Allegretti, Newitt, Witcoff & McAndrews, Ltd.

[57] ABSTRACT

A shock absorber removing tool is disclosed. The tool consists of a breaker coupling threaded to a solid plug insert, with a portion of the solid plug insert retained by the inner surface at one end of a tubular handle. The end breaker coupling opposite the solid plug insert is threaded onto the threaded external end of the shock absorber, and the breaker coupling, solid plug insert, and tubular handle cooperatively define a rigid lever arm rigidly attached to the external end of the shock absorber. The tool removes a shock absorber from a mounting bracket on a vehicle by using the lever arm to bend and thereby break the shock stem.

8 Claims, 4 Drawing Figures

Fig. 2
Fig. 3
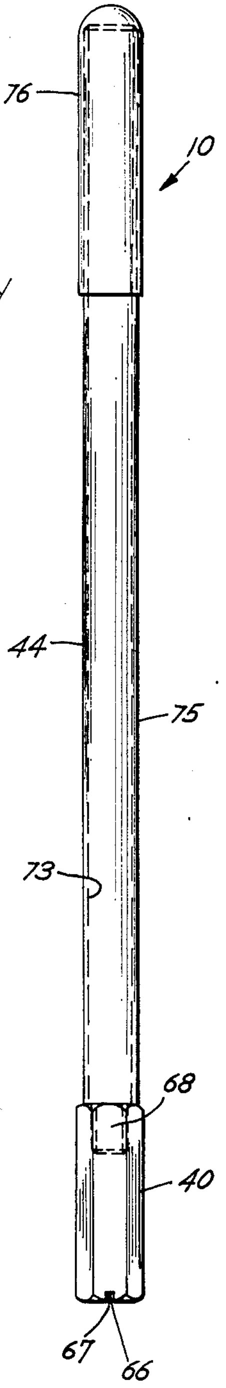
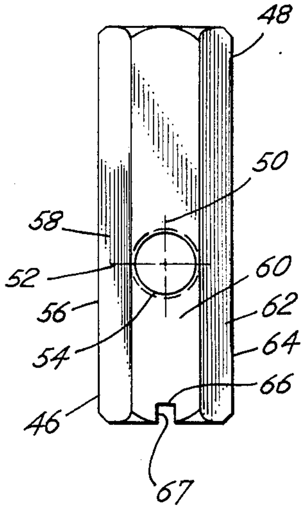
Fig. 1
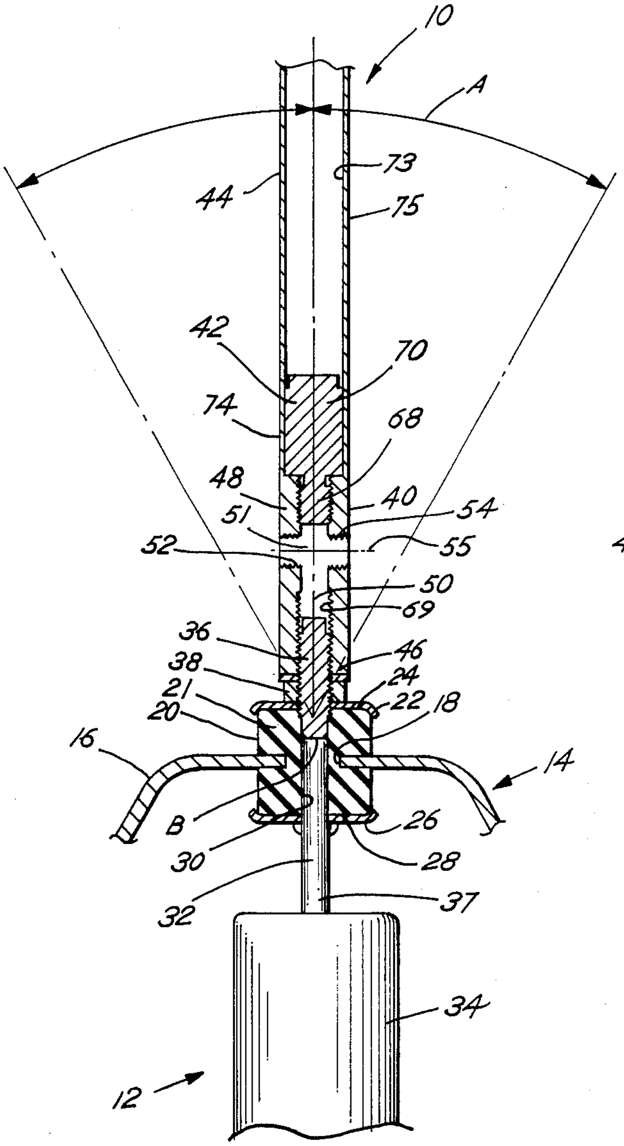
Fig. 4
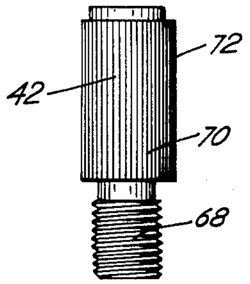

SHOCK ABSORBER REMOVING TOOL

BACKGROUND OF THE INVENTION

This invention relates to a tool for removing a used shock absorber from a vehicle. More particularly, this invention relates to a tool that can quickly, easily, inexpensively, and safely break a shock stem on a shock absorber to permit removal from the mounting bracket in which the shock absorber is mounted in the vehicle.

Shock absorbers have long been used for automotive and other types of vehicles to (1) absorb shock imparted to the vehicle's wheels by the road surface and (2) dampen oscillation of springs associated with the wheel mounting assembly. Typically, a shock absorber includes a cylindrical shock body, a shock stem extending outwardly from a piston mounted in the cylinder, and attachment devices for securing the shock stem and the shock body between the wheel assembly and the chassis of the vehicle. Thus, the end of the shock body opposite the shock stem will be attached to a lower mounting bracket that supports the wheel. The opposite end of the shock absorber, defined by the end of the shock stem, will be secured to an upper mounting bracket, which is rigidly attached to the chassis or frame of the vehicle. Usually, the external end of the shock stem is threaded and extends through the mounting bracket to be held in position in the mounting bracket by means of a lock nut threaded on the threaded external end of the shock stem. The mounting bracket commonly is located in a position which makes access very difficult for removal of the lock nut.

Like all mechanical devices, shock absorbers wear and deteriorate through use. For example, automobile shock absorbers often must be replaced after 30-40,000 miles of use of the automobile in which the shock absorbers are mounted. Thus, for many decades, the volume of shock absorber replacement business has been very large and there has been a correspondingly large financial incentive to develop a quick, easy, inexpensive, and safe way of removing worn shock absorbers from the vehicles in which they were used. Despite the existence of this financial incentive over the past four or five decades, the methods of removing used shock absorbers have remained very time consuming, cumbersome, dangerous, or expensive.

For example, one known prior art method of removing a used shock from the chassis mounting bracket requires holding the top of the stem in place (to prevent it from rotating) with a tool, such as a wrench, while simultaneously turning the lock nut with another tool until the nut is removed from the threaded end of the shock stem. Then the shock stem must be removed from the passage on the mounting bracket. The shock stem of a used shock absorber, however, is often rusted so severely that the nut cannot be twisted off of the threaded end of the stem without a great deal of effort. Indeed, frequently the rust is so severe that the nut cannot be twisted at all without stripping the threads on the shock stem, making it impossible to remove the nut by unscrewing it from the threaded end of the stem.

In an attempt to more effectively remove the nut from the rusted stem, special sockets have been designed to slide over the threaded end of the shock stem and grip the periphery of the nut. The sockets are then rotated by means of a socket wrench in order to twist the nut off of the rusted threaded end of the shock stem. Although such a special socket does provide much better gripping of the nut of the stem, the socket cannot avoid the problem of severe rust causing the nut when turned to simply strip the threads on the stem, making unthreading impossible. Moreover, even if the threads on the stem do not become stripped, the socket and nut are often very difficult to turn because of the location of the upper mounting bracket.

Another prior art method entails sliding one end of a tubular socket over the threaded end of the shock stem, inserting a metal rod, such as a screw driver, into the free end of the socket, and pushing the free end of the screw driver to apply torque to shock stem to break the shock stem at a point intermediate the lock nut and shock body. Because the tubular socket does not rigidly attach to the threaded end of the shock stem and the screw driver does not rigidly attach to the socket, the socket or screw driver or both can easily slip and move in an undesired and extremely unsafe manner. Such slippage can easily cause injury to the mechanic, as well as consume a good deal of time. Moreover, this method often causes damage to the socket or screw driver by subjecting them to excessive, unintended forces and contact with each other and the shock stem.

It is therefore an object of the present invention to develop a tool for easily, quickly, economically, and safely removing a shock absorber from a mounting bracket in a vehicle.

It is also an object of the present invention to provide such a tool that will not cause damage to the tool when force is applied to the tool in order to break a shock stem of a shock absorber while mounted in the mounting bracket on a vehicle.

It is a further object to provide such a tool that can be used to remove shock absorbers from a wide variety of vehicles regardless of the proximity of the mounting bracket to the body or other components of the vehicle.

It is yet another object to provide such a tool that has interchangeable parts, allowing use of the tool to remove shock absorbers having differing types and sizes of shock stems.

Another object is to provide such a tool that utilizes the minimum amount of material for economy in manufacturing and shipping while having sufficient strength to function as a lever arm to break the shock stem of a shock absorber.

An additional object is to provide such a tool in which the tool is easily and quickly adjustable to reach and remove shock stems from upper mounting brackets despite differing locations of the mounting brackets with respect to the vehicle bodies in differing types of vehicles.

There are other objects and advantages of my invention. They will become apparent from the description within.

SUMMARY OF THE INVENTION

The foregoing and other objects and advantages are accomplished by my invention of a tool for removing a shock absorber from a mounting bracket on a vehicle. The type of shock absorber removable by my invention typically includes a shock stem associated with a mounting plate on a vehicle, with the shock stem having a threaded stem end extending from means for retaining the shock stem in the mounting bracket. The tool of my invention includes a coupling, which is rigidly attached at one end to the threaded, free end of the shock stem. A lever arm with a handle portion extends from the coupling and provides a means for gripping so that the lever arm may be moved through an arcuate path about the stem end to break the shock stem.

BRIEF DESCRIPTION OF THE DRAWINGS

In the accompanying drawings, one particular embodiment of the shock absorber removing tool of the present invention is illustrated wherein:

FIG. 1 is a cross-sectional plan view of the shock absorber removing tool rigidly attached to an upper mounting bracket on a vehicle;

FIG. 2 is a plan view of the tool, showing three interconnected sections: a (1) breaker coupling threaded to a (2) solid plug insert, with the solid plug insert inserted into a (3) tubular handle;

FIG. 3 is a plan view of the breaker coupling, depicting a tapped passage in the side of the breaker coupling and a rust stripping channel penetrating an end of the breaker coupling; and FIG. 4 is a plan view of the solid plug insert having a threaded interconnecting section extending from a fluted inserting portion.

DETAILED DESCRIPTION OF THE PREFERRED EMBODIMENT

Referring to FIG. 1, the preferred embodiment of the shock absorber removing tool, generally 10, is designed to rigidly and removably attach to a shock absorber, generally 12, when mounted on, and retained by, an upper mounting bracket, generally 14, in a vehicle. It should be recognized that the particular embodiment of the upper mounting bracket 14 shown in FIG. 1 is only one of many types of mounting brackets with which the present invention may be used.

The mounting bracket 14 includes a metal plate 16 with a grommet passage 18 therethrough. A grommet assembly 20 includes a resilient central grommet 21 positioned in the grommet passage 18 and extending from the grommet passage 18 on both sides of the plate 16. The grommet assembly 20 also includes (1) an upper metal washer 22 abutting the upper end 24 of the resilient central grommet 21 and (2) a lower metal washer 26 abutting the lower end 28 of the resilient central grommet 21. The grommet assembly 20 defines a stem passage 30 coaxial with the grommet passage 18 in the plate bracket 16 for receipt of a shock absorber stem.

Still referring to FIG. 1, the shock absorber 12 includes a shock body 34 and a sliding shock stem 32 extending outwardly from the shock body 34. The shock stem 32 typically is the rod extension of a sliding piston (not shown) retained within a cylinder defined by the shock body 34. The stem 32 terminates at a threaded external end 36, and an interconnecting portion 37 extends between the sliding piston and the threaded external end 36.

The threaded external end 37 extends upwardly from the side of the grommet assembly 20 opposite the shock body 34. A lock nut 38 is threaded on the threaded external end 36 to firmly retain stem 32 in the grommet assembly 20. In this manner, the shock stem 32 is held firmly in position within the stem passage 30 in the grommet assembly 20 and therefore also within the grommet passage 18 in the plate bracket 16.

With continuing reference to FIG. 1, the preferred embodiment of the shock absorber removing tool 10 includes a breaker coupling 40, a solid plug insert 42, and a tubular handle 44. The breaker coupling 40 may be threaded onto the threaded external end 36 of the stem 32; the solid plug insert 42 is rigidly and removably attached to the breaker coupling 40, and the solid plug insert 42 is rigidly retained by one end of the tubular handle 42.

More specifically, the breaker coupling 40 includes: (a) a first tapped end 46 threaded onto the threaded external end 36, (b) a second tapped end 48 coaxial with and opposite the first tapped end 46, (c) a middle portion 52 intermediate the first 46 and second 48 tapped ends, and (d) a breaker axis 50 extending the axial length of a through-bore 51 interconnecting the first tapped end 46 and the second tapped end 48 along the axis of the first 46 and second 48 tapped ends. The breaker coupling 40 also has a third tapped portion 54 defining an axis 55 intersecting the breaker axis 50. Preferably, the third tapped portion 54 penetrates the middle portion 52 of the breaker coupling 40 perpendicularly to the breaker axis 50 of the breaker 40.

As shown in FIG. 3, the outside surface of the breaker coupling 40 has an hexagonal cross-section (not shown) defining six planar sides (only three of which 58, 60, 62, are shown), each such planar side 58, 60, 62, being parallel to the breaker axis 50. The six planar sides thus form an hexagonal periphery that can easily be grasped or clamped and then rotated around the breaker axis 50 with a tool such as a crescent wrench (not shown).

As also shown in FIG. 3, the breaker coupling 40 has a stripping slot 66 milled in its first tapped end 46. The slot 66 is transverse to, and intersects, the breaker axis 50 and defines a planar surface 67 parallel to the breaker axis 50. The planar surface 67 abuts the threading 69 of the first tapped end 46 to define a cutting edge in the threading 69 of the first tapped end 46. The slot 66 serves to cut away rust or damaged threads from the threaded external end 36 of the shock stem 32 when the breaker coupling 40 is threaded on the threaded external end 36.

With reference back to FIG. 1, the first tapped end 46 of the breaker coupling 40 is threaded with a pitch diameter that is somewhat oversized with respect to the pitch diameter for the threading on the threaded external end 36 of the shock stem 32. This oversizing should be just enough to allow the first tapped end 46 to thread firmly on a severely rusted threaded external end 36 without requiring extreme effort by the mechanic. In this regard, shown below, using Mill Standard H28 measurements, is the preferred oversizing for three popular types of shock stems:

| Thread Size of Shock Stem | Thread Size of Tapped End |
|---|---|
| 1. 3/8 - 24 UNF-2A (P.D. .3468/.3430) | 3/8 - 24 (P.D. .3583/.3509) |
| 2. 3/8 - 16 UNC-2A (P.D. .3331/.3287) | 3/8 - 16 (P.D. .3459/.3374) |
| 3. M1O X 1.5-6 g (P.D. .3540/.3489) | M1O x 1.5 (P.D. .3654/.3583) |

Referring now to FIG. 4, the plug insert 42 has two ends: (a) a threaded interconnecting end 68; and (b) an inserting portion 70. The inserting portion 70 has a fluted periphery 72, and, referring back to FIG. 1, the fluted periphery 72 is friction fitted into the inner surface 73 of the lower end 74 of the tubular handle 44. The plug insert 42 and tubular handle 44 thus define a handle rigidly and removably mountable on the breaker 40.

In this regard, the interconnecting end 68 of the plug insert 42 is alternatively threadable into the second tapped end 48 or the third tapped portion 54 in the breaker coupling 40. In the particular arrangement shown in FIG. 1, the interconnecting end 68 is threaded into the second tapped end 48 to provide a rigid lever arm that (1) is rigidly and removably attached to the external threaded end 36 of the shock stem 32 and (2) firmly abuts the side of the lock nut 38 opposite the upper washer 22 of the grommet assembly 20.

In the preferred embodiment of FIG. 1, the breaker coupling 40 and plug insert 42 are both comprised of ASTM A-311 Class B 1144 stress relieved steel. The tubular handle 44 is comprised of ASTM A-513 1020/26 DOM welded steel tubing.

The handle 44 is tubular, yet the plug insert 42 is solid. This arrangement greatly reduces the material and shipping cost for the overall tool 10 while maintaining sufficient strength at the junction of the breaker coupling 40 and plug insert 42 for the entire tool 10 to effectively function as a lever arm to break the shock stem 32.

The preferred method of removing the shock absorber 12 from the upper mounting bracket 14 includes the steps of:

(a) maintaining a stock of three breaker couplings, the first breaker coupling 40 having a first tapped end with thread size ⅜-24 (P.D. 3583/3509), the second breaker coupling having a first tapped end with thread size ⅜-16 (P.D. 3459/3374), and the third breaker coupling having a first tapped end with thread size M10×1.5 (P.D. 3654/3583);

(b) determining the thread size of the threaded external end 36 of the shock stem 32;

(c) selecting from the stock a breaker coupling 40 having a first tapped end 46 with a thread size somewhat oversize with respect to the thread size of the threaded external end 36 of the shock stem 32;

(d) threading the first tapped end 46 of the breaker coupling onto the threaded external end 36 of the shock stem 32 to firmly and intimately abut the side of the lock nut 38 opposite the upper washer 22;

(e) threading the interconnecting end 68 on the plug insert 42 in the tubular handle 44 into the second tapped end 48 or, alternatively, the third tapped portion 54 in the breaker coupling 40, thereby providing a rigid lever arm rigidly attached to the external end 36 of the shock stem 32;

(f) gripping the outer surface 76 of the tubular handle 75 on the end of the lever arm opposite the breaker coupling 40; and (g) moving the tubular handle 75 of the lever arm back and forth through an arcuate path A about a point intermediate the lock nut and shock body to fatigue and thereby break the shock stem at a point B intermediate the lock nut 38 and shock body 34.

The preferred tool and method of the present invention provides a reliable, quick, easy, inexpensive, and safe way of removing a shock absorber from a mounting bracket on a vehicle. Moreover, the tool is very economical to manufacture and ship, as the tool uses a minimum of steel material to construct a lever arm having the requisite stiffness and strength.

While in the foregoing, there has been provided a detailed description of one particular embodiment of the tool of the present invention, it should be understood that the scope of the invention claimed includes all equivalent tools. For example, while the foregoing preferred tool has been described as used to remove a particular shock absorber from a particular mounting bracket, the present invention encompasses equivalent tools useable to remove other types of shock absorbers from other types of mounting brackets.

What is claimed is:

1. A tool for fracturing the stem of a shock absorber to permit removal of the stem from an associated mounting bracket for the stem, the stem having a threaded stem end fastened to a mounting bracket and extending from means for retaining the shock stem in the mounting bracket, the tool comprising in combination:

(a) coupling means for rigid attachment to the stem end, said coupling means having a first threaded coupling end threadably connectable to the stem end, a second threaded coupling end, and a third threading coupling portion;

(b) handle means removably attachable to, alternatively, the second threaded coupling end or third threaded coupling portion on the coupling means to thereby define a lever arm whereby force may be applied to the handle means to bend and fracture the stem.

2. The tool of claim 1 wherein the second coupling end is coaxial with the first coupling end and the third coupling portion defines an axis that intersects the axis defined by the first and second coupling ends.

3. The tool of claim 1 wherein the threading of the first coupling end is oversized relative to the threading of the stem end on the shock absorber.

4. The tool of claim 3 wherein the coupling means further includes a stripping means at the first coupling end for providing a rust cutting member.

5. The tool of claim 4 wherein the stripping means comprises a slot in the first coupling end, the slot having a planar surface parallel to the axis of the first and second coupling ends and abutting the threading of the first coupling end to define a rust cutting edge in the threading of the first coupling end of the coupling means.

6. The tool of claim 1 wherein the handle means comprises (a) a tubular handle having an inner and an outer surface and (b) a solid plug insert defining a threaded interconnecting end opposite an inserting portion frictionally engaging the inner surface of the tubular handle whereby force applied to the outer surface of the handle is transferable through the solid plug insert and the coupling means to break the stem.

7. A tool for removing the stem of a shock absorber from an associated mounting bracket for the stem, the stem having a threaded stem end extending from means for retaining the shock stem in the mounting bracket, the tool comprising in combination:

(a) a breaker coupling having a first tapped end, a second tapped end coaxial with the first tapped end, and a third tapped portion defining an axis that intersects the axis defined by the first and second tapped ends, the first tapped end being threadably and rigidly connectable to the threaded stem end;

(b) a solid plug insert defining an inserting end and a threaded interconnecting end opposite the inserting end, the interconnecting end being threadable into, alternatively, the second tapped end or the third tapped portion in the breaker coupling;

(c) a tubular handle having an outer handle surface and an inner surface, and the inserting end of the solid plug insert frictionally engaging the inner surface of the tubular handle;

the breaker coupling, solid plug insert, and tubular handle cooperatively defining a rigid lever arm rigidly and removably attachable to the threaded stem end whereby force applied to the handle surface of the tubular handle is transferable through the solid plug insert and breaker coupling as stem-breaking bending force to the stem of the shock absorber.

8. The tool of claim 7 wherein:

(a) the breaker coupling also has a slot in the first tapped end defining a planar surface parallel to the axis of the first and second tapped ends, the planar surface abutting the threading of the first tapped end to define a cutting edge in the threading of the first tapped end; and (b) the threading of the first tapped end is oversize with respect to the threading on the threaded stem end.

* * * * *